Sept. 15, 1931.　　　　J. GORDON　　　　1,823,268
STOP GAUGE
Filed June 21, 1930　　5 Sheets-Sheet 1
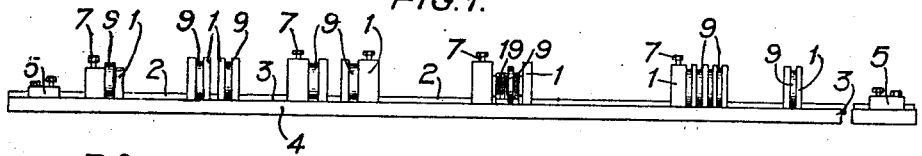
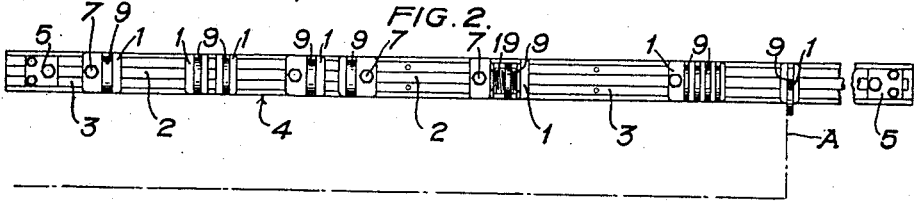
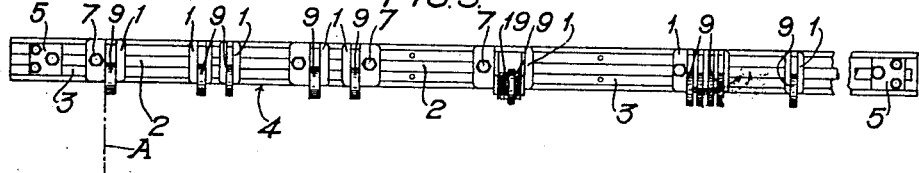
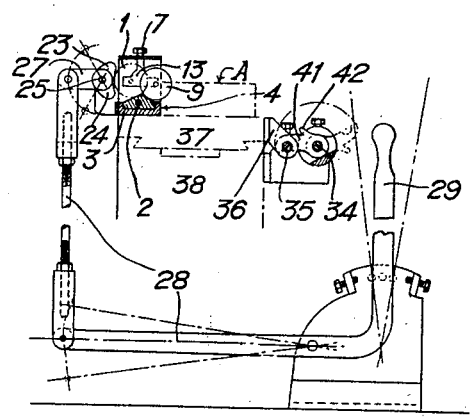
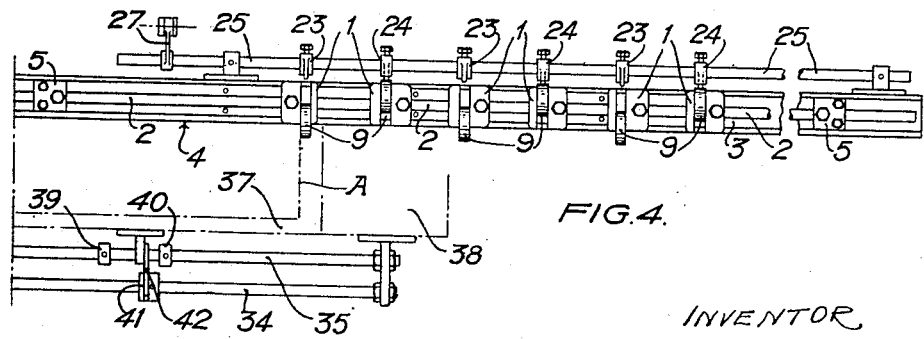
INVENTOR
JAMES GORDON Sept. 15, 1931.  J. GORDON  1,823,268
STOP GAUGE
Filed June 21, 1930  5 Sheets-Sheet 2

INVENTOR
JAMES GORDON

Sept. 15, 1931. J. GORDON 1,823,268
STOP GAUGE
Filed June 21, 1930 5 Sheets-Sheet 3
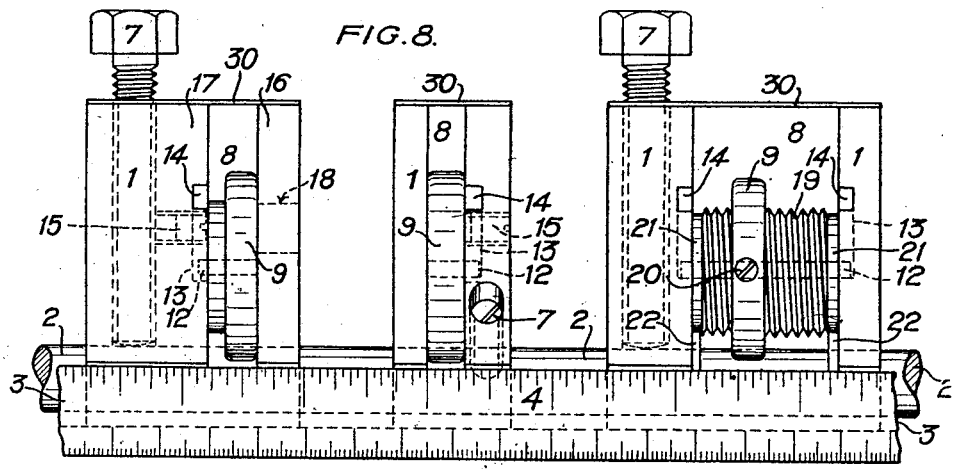
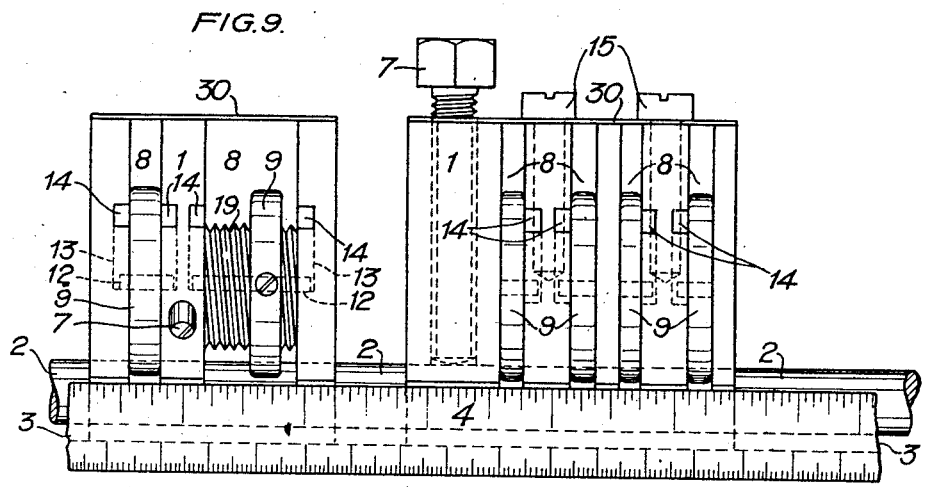
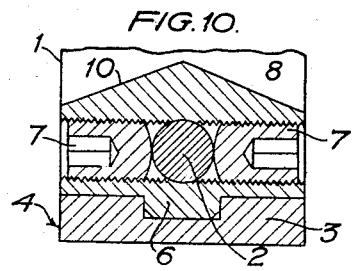
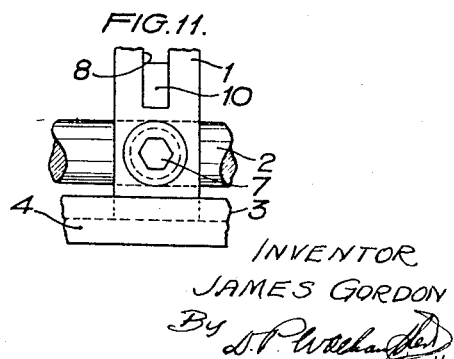
INVENTOR
JAMES GORDON Sept. 15, 1931.     J. GORDON     1,823,268
STOP GAUGE
Filed June 21, 1930      5 Sheets-Sheet 4

INVENTOR
JAMES GORDON
By D. P. Wollhau
Atty

Sept. 15, 1931. J. GORDON 1,823,268
STOP GAUGE
Filed June 21, 1930 5 Sheets-Sheet 5

INVENTOR
JAMES GORDON
By
Atty

Patented Sept. 15, 1931

1,823,268

UNITED STATES PATENT OFFICE

JAMES GORDON, OF SORRENTO, ARGENTINA

STOP GAUGE

Application filed June 21, 1930, Serial No. 462,871, and in Great Britain July 5, 1929.

This invention relates to a stop gauge device for use with wood and metal-working machines.

The object of the invention is to provide an adjustable stop gauge device suitable for accurate production of repetition work and one which obviates the construction of special stops for each class of work.

The stop gauge device is adapted to be set up apart from the machine tool, thus reducing the time during which the machine is idle. The positioning of the set stop gauge in relation to the machine tool being a simple matter, the machinist is engaged on productive work for the maximum possible time of the working period.

Broadly, the present invention comprises a series of slidably adjustable stops, each with one or more displaceable and retractible locating elements which are movable between the operative and inoperative positions along inclined planes. The locating elements may be of roller or tongue form. The said locating elements are adapted to assume automatically the operative position as the work is moved relative to the working face of the gauge, that is, the locating elements roll or drop under gravity action into the operative position when they project out from the working face of the gauge—from an inoperative position or from a position intermediate between the operative and inoperative positions. Displacement of the locating elements from the inoperative positions to positions from which they may gravitate to operative positions is preferably effected by pedal or lever-operated mechanism, a plurality of elements being simultaneously displaced. The individual locating elements may be retracted from their operative positions either manually or by contact with the work as it is moved between operations.

In some cases the locating elements may be mounted so as to be laterally adjustable in relation to the stop member by which it is supported. The stop members are employed in combination with a suitable measuring appliance or with a master template for facilitating relative positioning of the stops.

Embodiments of the invention are illustrated in the accompanying drawings, wherein:—

Figure 1 is an elevation of the stop gauge showing the stop blocks in association with a trough-like measuring scale.

Figure 2 is a plan view of the gauge of Figure 1, showing how the locating elements are held back by the work.

Figure 3 is a view similar to Figure 2 showing how the locating elements normally project when the work is moved along.

Figure 4 is a plan view of the gauge showing the means for ejecting the locating elements into the operative position.

Figure 5 is a cross-sectional view of the structural arrangement illustrated in Figure 4.

Figures 8 and 9 are front elevations of portions of the measuring scale showing various forms of stop blocks.

Figures 10 and 11 are fragmentary cross-sectional view and front elevation of a modified form of measuring scale and method of supporting the stop blocks.

Figure 6:
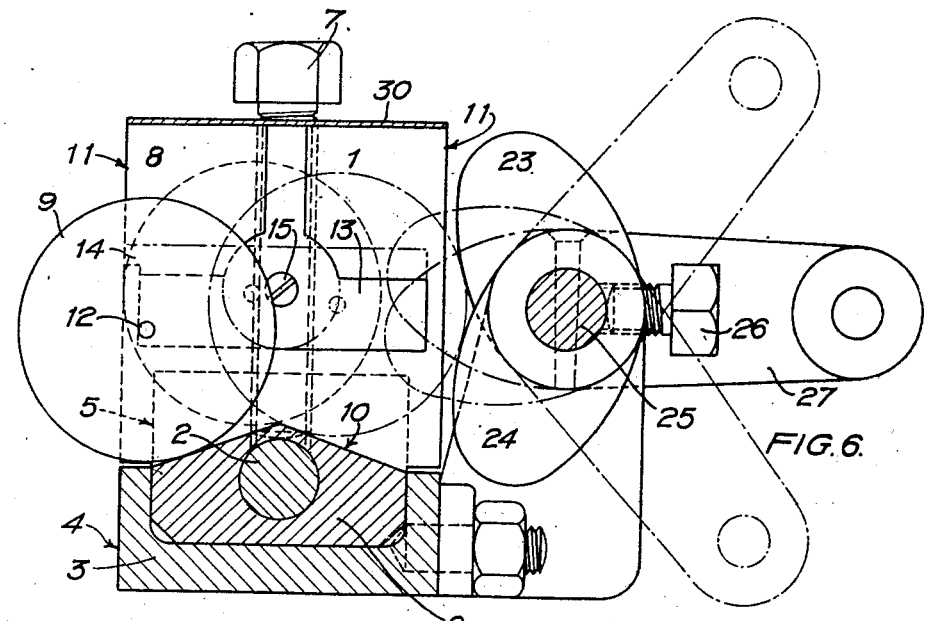
Figures 6 and 7 are a vertical cross-section and a fragmentary plan view of a gauge according to the construction of Figure 1, illustrating the form and operation of the roller locating elements and ejecting means.

In the embodiment of the invention illustrated in general by Figures 1-5 and in detail by Figures 6, 7, 8, 9, 12 and 13 a series of stop blocks 1 are slidably mounted on a fixed carrier member 2, for adjustment therealong to different relatively spaced positions. It is preferred to use the carrier member 2 in combination with a member 3 provided with a fixed measuring scale along one face thereof. The stop blocks 1 are supported by and interengage the said scale member 3. The carrier rod 2 is held secure to the scale member 3 in and by brackets or bearings 5. The scale member 3 is of trough or channel form, above and parallel to the sides or walls of which is supported the carrier rod (or tube) 2. The stop blocks 1, are of substantially rectangular shape, each having the lower portion 6 fashioned to fit into scale-bearing trough or channel 3, their positions relative to one another being gauged or determined by registering the stop blocks 1 with graduations marked on the outer face 4 of the wall of the trough 3. Set-screws 7, or other suitable means, are employed to retain the stop blocks 1 in their respective adjusted positions.

The stop blocks 1 are each formed with a transverse bifurcation or slot 8 in which to guide and accommodate the locating elements 9 of roller form, the floor 10 of the bifurcation or slot 8 being of inverted V-form with the peak or crest at the centre, the two portions of the floor 10 sloping down therefrom towards the openings 11, 11 at opposite sides of the stop block 1. The rollers 9 are each provided with centrally or axially disposed pins or spindles 12, the pin or spindle 12 being employed in some cases for supporting the roller 9, in which case the inverted V-form or inclined floor 10 can be dispensed with—see Figures 9 and 12. In other cases, the centrally or axially disposed pin or spindle 12 (which outwardly projects from one or both sides of the roller 9) is received within a transverse recess or groove 13 in one or both side faces of the bifurcation or slot 8. The main portion of the recess or groove 13 terminates before it reaches either face of the block 1, and thus forms a trap which, by guiding the pin or spindle 12, prevents the roller 9 moving completely out of the bifurcation or slot 8. The guiding pin or spindle 12 of the roller 9 enters the recess or groove 13 through a communicating channel 14 at the top—as in Figure 6—or at the side thereof—as in Figures 8, 9 and 13.

The travel of the guiding pin or spindle 12 may be confined to one of the inclined portions of the inverted V-floor 10 by means of a screw or pin 15 set in the path of the pin or spindle 12 above the crest of the V-floor 10.

Figure 7:
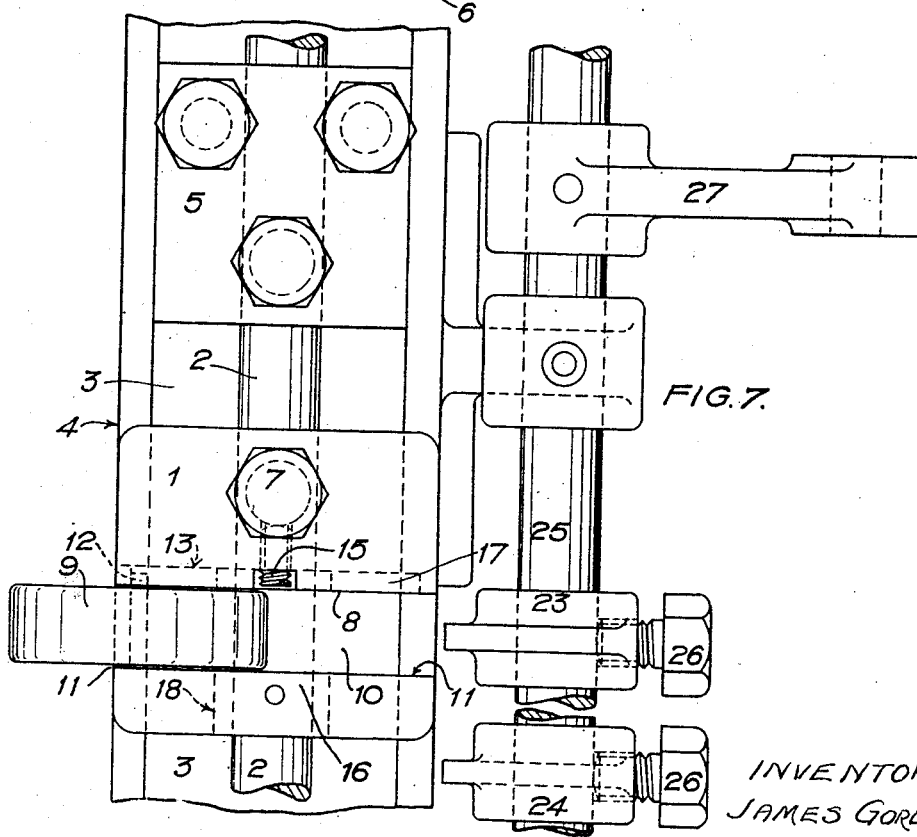
Figure 12:
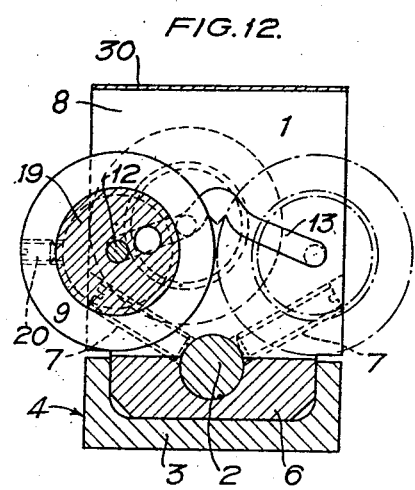
Figures 12 and 13 are cross-sectional views of two of the stop block constructions illustrated in Figures 9 and 8 respectively.
Figure 13:
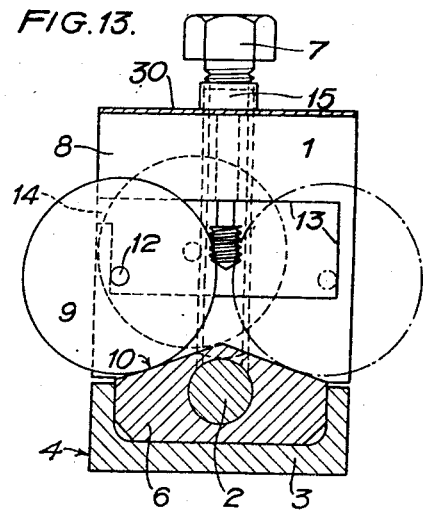

The blocking pin or screw 15 may be of cheese-head form as in the multiple-roller stop block construction of Figures 9 and 13, or may simply be a small headless grub-screw as in Figures 6, 7 and 8. In the latter case, the grub-screw 15 may be screwed into one side wall 16 of the stop block 1 so that the screw-driver slot is directly accessible at the exterior surface of the said wall 16, as in the middle stop block 1, Figure 8, or if this is not expedient and it is preferred or necessary to have the grub-screw 15 set in the wall 17 on the other side of the bifurcation 8, a hole 18 in the stop block wall 16 is provided directly opposite the screw 15, as shown in Figure 7 and the left-hand stop block form in Figure 8.

The roller 9 may be a plain disc, as shown in Figures 6, 7, 8, 9 and 13, having a thickness substantially equal to the width of the bifurcation or slot 8 within which it travels, or the roller may be of composite construction, taking the form of a core 19 threaded for the whole or part of its length, which carried the locating element proper 9. The locating element in this case is in the form of a circular nut or screwed ring 9, being adjustably mounted on the threaded core 19. A set-screw 20 for locking the ring 9 in adjusted position along the core 19 is provided. The threaded roller may be borne or supported upon end flanges 21—see right hand of Figure 8—which moves over a pair of inclined or raised runners 22 similar to the floor 10 hereinbefore referred to. Alternatively, as shown in the left hand block of Figure 9 and in Figure 12, the composite locating roller may be supported by a centrally or axially disposed pin or spindle 12 running in recesses or grooves 13 on each side of the bifurcation 8. The rollers 9 are brought into operative position from the inoperative position selectively by hand or simultaneously or progressively as desired by means of cams 23, 24 adjustably mounted on a shaft 25 disposed parallel to the trough-like measuring base 3. The cams 23, 24 are locked to shaft 25 by set-screws 26. The cam-shaft 25 is oscillated to bring the cams 23, 24 into action by means of rocker 27 fixed thereto which is operated via suitable intermediary linkage 28 by a handle or lever 29; a pedal-operated arrangement may be substituted if desired. Dust covers 30 surmount the stop blocks 1.

The scale member 3 may be made of rolled-section metal, as in Figures 6, 7, 12 and 13, or manufactured from flat bar stock, as shown in Figures 10 and 11.

Figure 14:
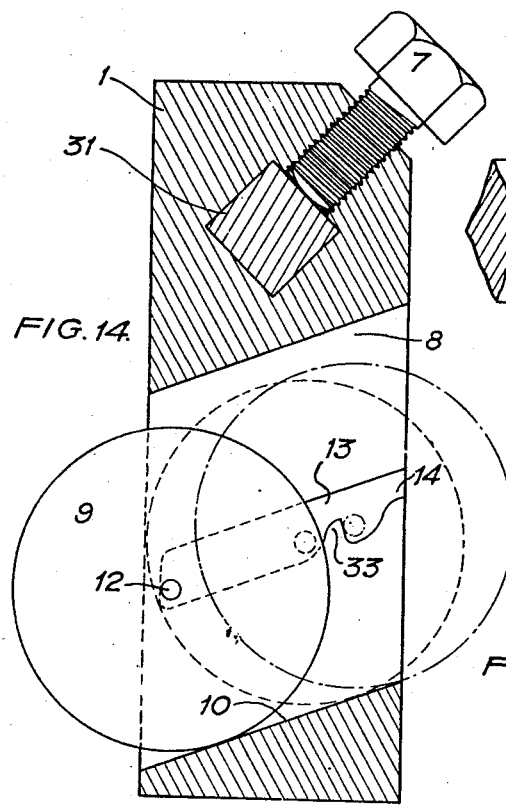
Figures 14 and 15 illustrate by cross-sectional view and front elevation a modified form of combined measuring scale and carrier member.
Figure 15:
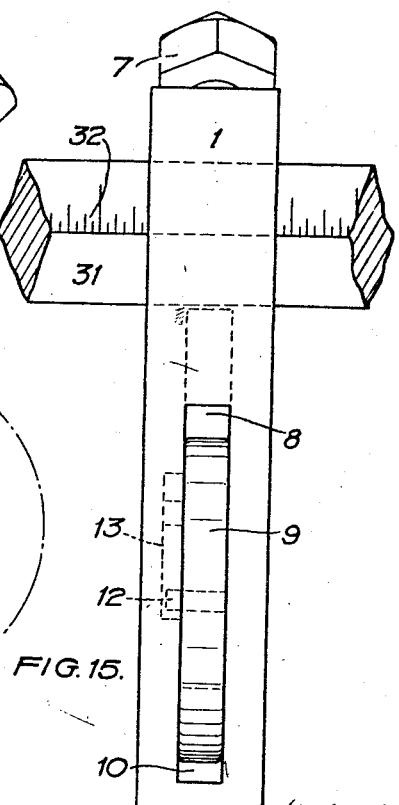
Figure 20:
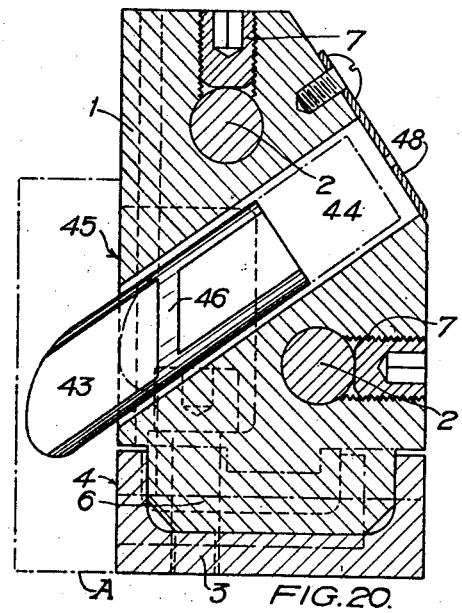
Figures 19, 20 and 21 are front elevation, vertical cross-section and plan respectively of the stop blocks employed in the arrangement of Figures 16-18.
Figure 19:
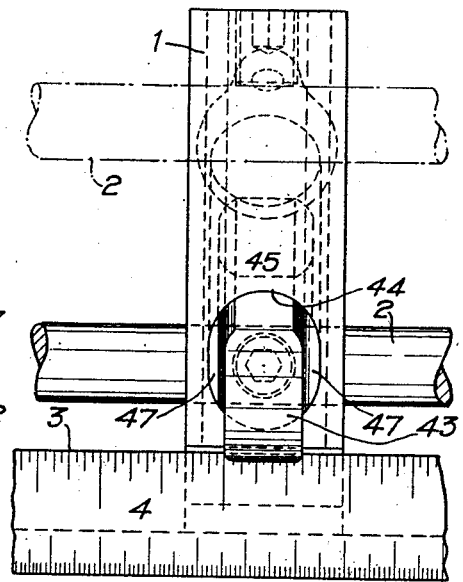
Figure 21:
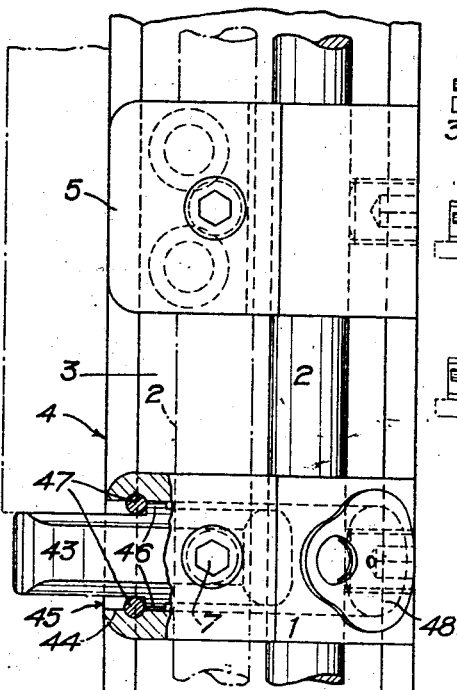

In a modified arrangement, illustrated in Figures 14 and 15, the circular carrier rod 2 is dispensed with and replaced by a square-section bar 31 bearing a scale 32 along one or more of its faces. The need for a trough or channel-like base 3 is in this case dispensed with, although for convenience such base 3 may be used simply for holding the stop blocks, the carrier bar being supported, if desired, in suitable bearings or brackets carried by said base. Figures 14 and 15 also illustrate an alternative arrangement of stop block, in which the floor 10 slopes in one direction only. To keep the roller 9 in the inoperative position, the rear end of the spindle recess 13 is provided with a projection behind which the spindle of the roller may be engaged. This projection may be a barrier-like stop 33, as illustrated, or a pin or screw piercing and projecting through the wall of the recess. The latter arrangement is clear without an illustration.

The operating cams hereinbefore referred to may be arranged to lift the roller 9 to disengage the spindle 12 thereof from behind the barrier-like stop 33, or the roller 9 may be moved between inoperative and operative positions by hand.

When the gauge device is used in conjunction with woodworking machines for mortising, longitudinally disposed rods 34, 35 are fitted in a fixed position on the machine. The rods 34, 35 pass through brackets 36 fitted to the movable machine table 37. Alternatively, if found more convenient, the rods 34, 35 can be fitted to the movable machine table 37, and brackets 36 fitted in a fixed position on the machine frame 38. The length or width of mortises to be made are determined by the distance which the bracket 36 is allowed to travel between the adjustable collars 39, 40 which are secured firmly to the inner rod 35 by set-screws or other suitable means. If mortises of different lengths or widths are required on one piece of work, one or more adjustable hinged catches 41 with finger pieces 42 are mounted on the outer rod 34. These catches are brought into action by hand or by other suitable means.

Figure 16:
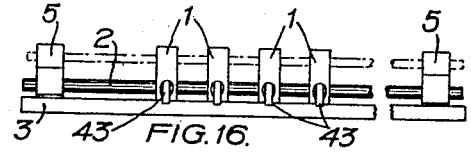
Figures 16, 17 and 18 are views similar to Figures 1, 2 and 3 of an alternative arrangement employing tongue-like locating elements in the stop blocks.
Figure 18:
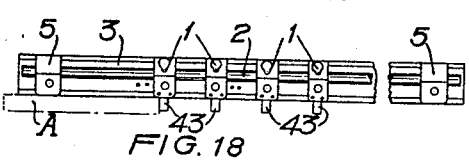
Figure 17:
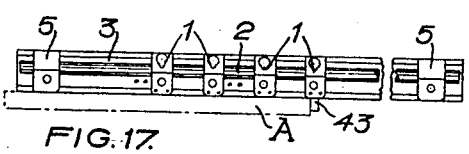
Figure 22:
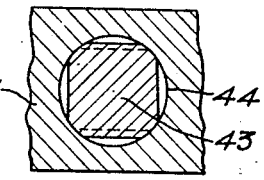
Figure 22 is a detail view relating to the stop block construction of Figures 19-21.

A modified construction of stop block, illustrated in Figures 16 and 22, employs tongue-like locating elements 43 which are slidably mounted in an inclined guideway 44 which slopes down to the working face 45 of block. Preferably the tongue-like bar 43 is of substantially square section to reduce the area of contact with the wall of the circular guideway 44—see Figure 22—within which it moves. The outward travel of the tongue bar 43 is controlled by providing lugs 46 which outwardly project therefrom and contact with suitable stop elements 47. Foreign matter likely to interfere with the free movement of the tongue is excluded from the guideway by means of a flap 48.

More than one carrier rod may be used if desired.

I claim:—

1. A stop gauge comprising a plurality of stops, a support for said stops along which they are adjustable to different relatively spaced positions, each stop having a vertical working face and a locating element supporting surface inclined downwardly and outwardly toward said working face, and a locating element supported on said surface for movement bodily under the influence of gravity to an operative position projecting beyond said working face and for retraction to an inoperative position inwardly with respect to said working face.

2. A stop gauge as set forth in claim 1 in which the locating element is in the form of a roller arranged to roll on said inclined supporting surface.

3. A stop gauge as set forth in claim 1 in which the stop members are bifurcated for the accommodation of the locating elements and in which the inclined supporting surface forms the bottom of the bifurcation and the locating element is in the form of a roller arranged to roll on said surface.

4. A stop gauge as set forth in claim 1 including means to limit the range of movement of the locating elements between their operative and inoperative positions.

5. A stop gauge as set forth in claim 1 in which each stop is provided with a second supporting surface inclining downwardly from the uppermost portion of the first mentioned supporting surface away from the working face of the stop, in combination with means for moving the locating element from the second surface to the first surface.

6. A stop gauge as set forth in claim 1 in which the locating element comprises a threaded core arranged to roll on said inclined surface, and a ring threaded on said core for adjustment therealong.

7. A stop gauge as set forth in claim 1 in which the locating elements are in the form of tongues slidably supported on said inclined surfaces.

In testimony whereof I have affixed my signature hereto this 13th day of May, 1930.

JAMES GORDON.